United States Patent [19]

Brais

[11] Patent Number: 4,986,412
[45] Date of Patent: * Jan. 22, 1991

[54] EXTENSIBLE CONVEYOR SYSTEM

[75] Inventor: Raymond Brais, Montreal, Canada

[73] Assignee: Walsh & Brais Inc., Brossard, Canada

[*] Notice: The portion of the term of this patent subsequent to Jan. 2, 2007 has been disclaimed.

[21] Appl. No.: 459,357

[22] Filed: Dec. 29, 1989

Related U.S. Application Data

[62] Division of Ser. No. 292,006, Dec. 30, 1988, Pat. No. 4,890,720.

[51] Int. Cl.⁵ .............................................. B65G 15/26
[52] U.S. Cl. ................................. 198/592; 198/594; 198/812; 299/67
[58] Field of Search ................ 198/594, 588, 585, 812

[56] References Cited

U.S. PATENT DOCUMENTS

| | | |
|---|---|---|
| 1,659,316 | 2/1928 | Enney . |
| 1,996,488 | 4/1935 | Philips . |
| 2,554,037 | 5/1951 | Lee .................................. 198/812 X |
| 2,862,604 | 12/1958 | Craggs et al. . |
| 3,039,596 | 6/1962 | Poundstone ........................ 198/812 |
| 3,204,755 | 9/1965 | Caine . |
| 3,251,449 | 5/1966 | Hoppmann . |
| 3,656,607 | 4/1972 | Gorget et al. . |
| 4,031,997 | 6/1977 | Nelson . |
| 4,245,738 | 1/1981 | Butcher et al. ..................... 198/812 |
| 4,890,720 | 1/1990 | Brais .................................. 198/592 |

*Primary Examiner*—H. Grant Skaggs
*Assistant Examiner*—D. Glenn Dayoan
*Attorney, Agent, or Firm*—Foley & Lardner, Schwartz, Jeffery, Schwaab, Mack, Blumenthal & Evans

[57] ABSTRACT

An extensible conveyor for following a continuous tunneling or mining machine. The conveyor frame is made up of identical modules which can be added end to end at the end of the frame, the modules including return reach rollers. A separate carriage frame is independently supported on a mobile support which advances with the advance of the mining machine. The carriage frame advances over the conveying belt frame and includes a conveying belt pulley over which the conveying belt extends. The carriage frame spaces the conveying reach of the belt from the return reach thereof as the carriage is being advanced in order to allow conveying reach rollers to be placed onto the frame as the carriage frame advances. An impact plate is provided at the discharge end of a transfer conveyor, wherein the impact plate extends below the conveying reach of the belt of a first conveyor.

3 Claims, 3 Drawing Sheets

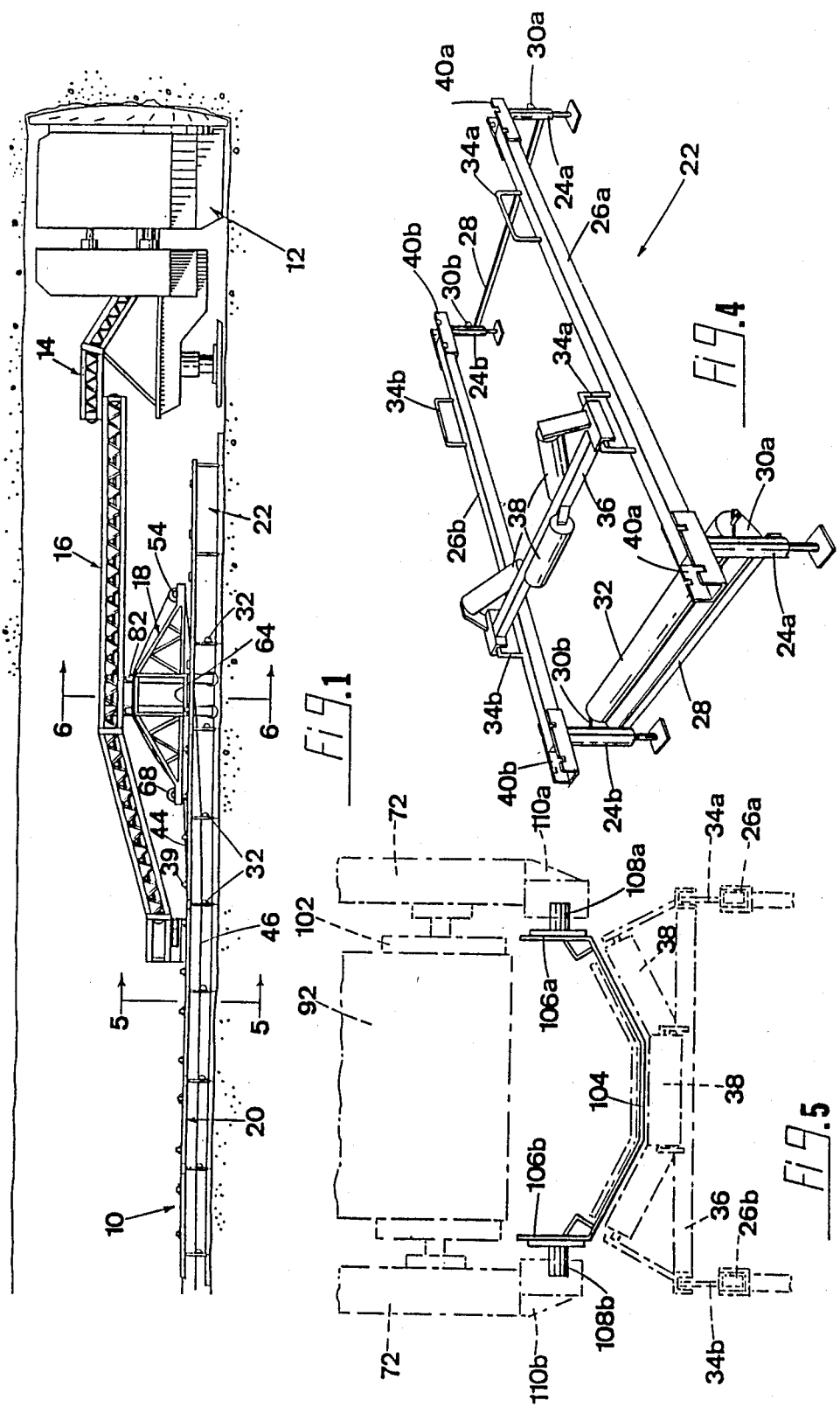

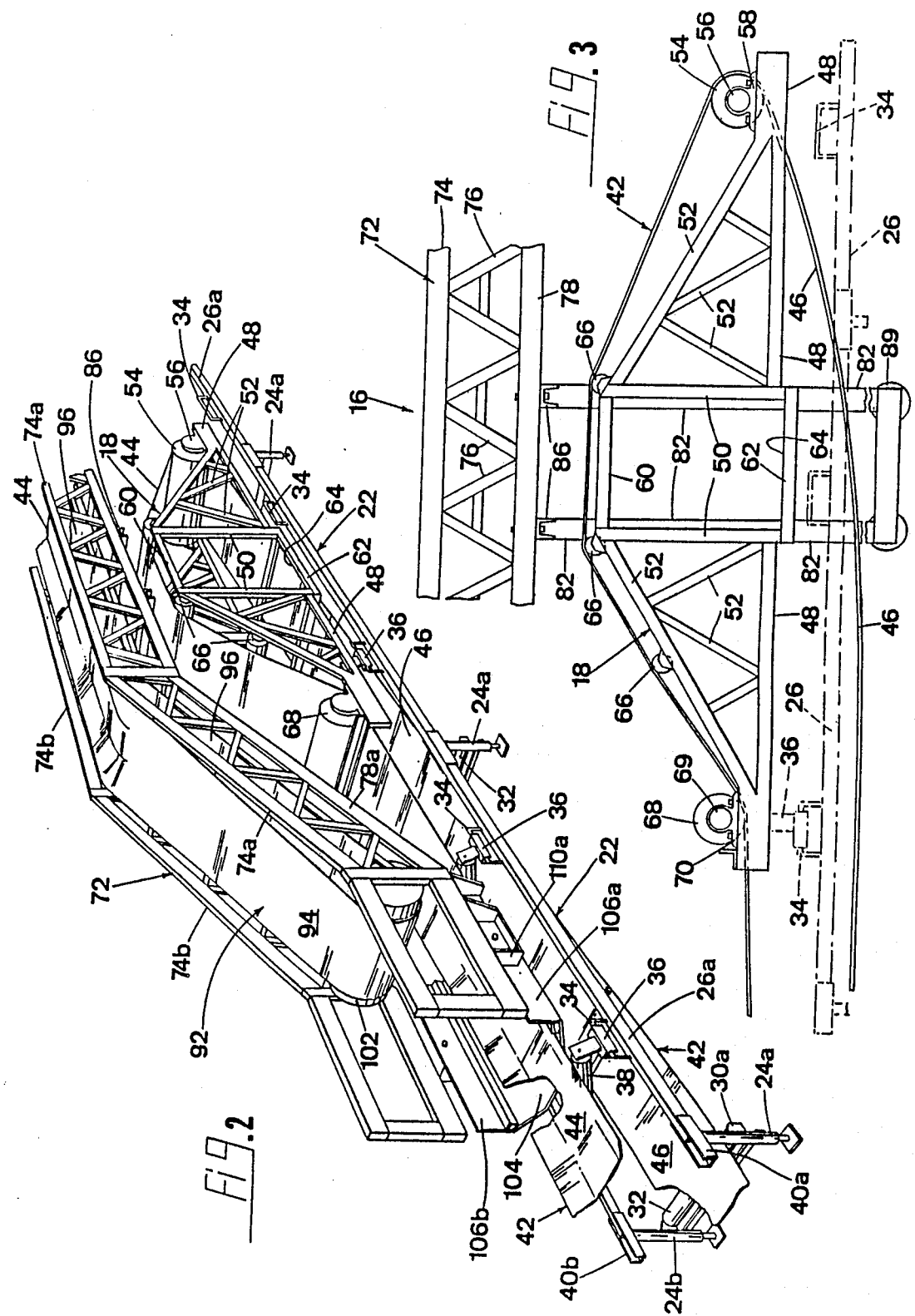

EXTENSIBLE CONVEYOR SYSTEM

CROSS-REFERENCE TO RELATED APPLICATION

This application is a divisional application of application Ser. No. 292,006 filed 12-30-88, now U.S. Pat. No. 4,890,720, issued Jan. 2, 1990.

BACKGROUND OF THE INVENTION

1. Field of the Invention

The present invention relates to conveyor systems, and more particularly, to an extensible conveyor for use in association with a continually advancing mine face.

2. Description of the Prior Art

In a typical mining operation such as tunneling, it is well known to use a continuous mining machine, such as a tunnel boring machine, to advance the mine face. The rock material or muck produced by the advancing mining machine can be hauled from the face area by means of conveyor systems which must be extensible to follow the advance of the mining machine. U.S. Pat. No. 4,031,997 to Nelson, issued June 28, 1977, summarizes the various prior art conveyor systems known at that time.

A continuous mining machine would typically have a transfer conveyor belt section for hauling the muck material from adjacent the mining tool to a discharge position a short distance behind the mining machine. An extensible conveyor belt system would typically be arranged to receive the muck as it is being discharged from the transfer conveyor.

Various devices have been suggested for advancing the tail section of the extensible conveyor. Such devices are described in U.S. Pat. Nos. 2,862,604, Craggs et al, issued Dec. 2, 1958; and 3,204,755, Caine, issued Sept. 7, 1965. These systems rely, however, on wire frames which are paid out from a tram or other device and the use of a conveyor belt magazine for tensioning and storing excess lengths of the belt.

Further, it has been found that the discharge of the muck onto the extensible conveyor on the conveying reach of the belt causes stresses by the impact of the falling muck, causing deterioration of the belt.

SUMMARY OF THE INVENTION

It is an aim of the present invention to provide an improved extensible conveyor system having a fixed rigid support frame and an inby or tail section which advances with the advancing mining machine.

It is a further aim of the present invention to provide an extensible conveyor system which is of simple and more efficient construction than the present available systems.

It is a further aim of the present invention to provide a conveyor belt support device on the conveying reach of the extensible conveyor coincident with the discharge point of the outby of the transfer conveyor.

A construction in accordance with the present invention comprises an extensible conveyor having an inby section and an outby section. The conveyor comprises an elongated, rigid, ground supported frame, a plurality of return reach idler rollers mounted in a return reach plane on the frame, and a plurality of conveying reach idler rollers mounted in a conveying reach plane above the return reach plane. A conveyor belt magazine means is associated with the elongated frame. Supplementary frame means including leg means and roller support means are adapted to be added to the inby section of the extensible conveyor in order to extend the elongated frame. Return reach rollers are mounted to the supplementary frame means. A bridge or carriage frame means is provided having an inby end and an outby end. Mobile support means are provided for supporting and moving the carriage frame means in a path above the elongated frame means for advance movement along the longitudinal axis thereof over the supplementary frame means. The carriage frame means includes a conveyor belt pulley at the inby end thereof and conveying reach rollers mounted thereon, and side access means are provided downstream of the pulley between the conveying reach rollers on the carriage frame and the return reach rollers on the supplementary frame ;means. An endless conveyor belt extends on the return reach and conveying reach rollers on the elongated frame, the supplementary frame, and the carriage frame and about the inby pulley on the carriage frame means and in the conveyor belt magazine. The conveyor system cn be extended by adding supplementary frame means at the inby end of the elongated frame while advancing the carriage frame means, and inserting conveying reach rollers through the access means onto the supplementary frame means between the conveying reach and return reach of the conveyor belt.

In a more specific embodiment of the present invention, there is provided a transfer conveyor associated with the mining machine, the transfer conveyor being suitable for hauling muck from the mining machine. The transfer conveyor includes a truss frame being supported at its inby end at the mining machine and at its outby end in the area of the bridge frame, with the discharge of the transfer conveyor on the receiving section of the extensible conveyor downstream of the bridge frame.

In another aspect of the present invention, there is provided a first conveyor means including a frame and conveying reach rollers on the frame. A conveyor belt reach passes over the rollers, and a receiving section is defined by the first conveyor. A second conveyor in the form of a transfer conveyor having an outby end is provided for hauling bulk materials to be discharged onto the receiving section defined by the first conveyor. The second conveyor includes a discharge frame and a belt support plate mounted to the discharge frame and extending between the conveying reach of the conveyor belt and the conveying reach rollers of the first conveyor at the receiving section thereof. The conveyor belt conveying reach is supported by the support plate against bulk material falling onto the receiving section of the first conveyor.

It is an advantage to have the bridge frame following the transfer conveyor and with the discharge end of the transfer conveyor over the conveyor on the elongated frame, and in particular, the supplementary frame means since the carriage frame must follow the advance of the transfer conveyor, and thus the discharge at the outby end of the transfer conveyor will always be in the same relation to the extensible conveyor. The conveyor belt is, in fact, being pulled under tension by the carriage frame, and in particular, the pulley at the inby end of the carriage frame, whereby the belt is paid out from the conveyor belt magazine. The carriage frame is of particular advantage since it provides access to insert conveying reach rollers on the supplemental frame means while holding the conveying reach and the return reach of the conveyor belt spaced apart.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a schematic side elevation showing the various parts of the present invention when used with a tunnel boring machine;

FIG. 2 is a perspective fragmentary view of the inby end of the extensible conveyor illustrating the carriage frame and the outby end of the transfer conveyor;

FIG. 3 is a fragmentary side elevation of the details shown in FIG. 2 with the elongated frame shown in dotted lines;

FIG. 4 is a perspective view of a detail of the present invention, and in particular, a module for the supplementary frame;

FIG. 5 is an end elevation view of a detail of one of the embodiments of the invention, with the elements of the transfer conveyor belt and the elongated frame being shown in dotted lines and taken somewhat along line 5—5 of FIG. 1.

DESCRIPTION OF THE PREFERRED EMBODIMENTS

Figure 6:
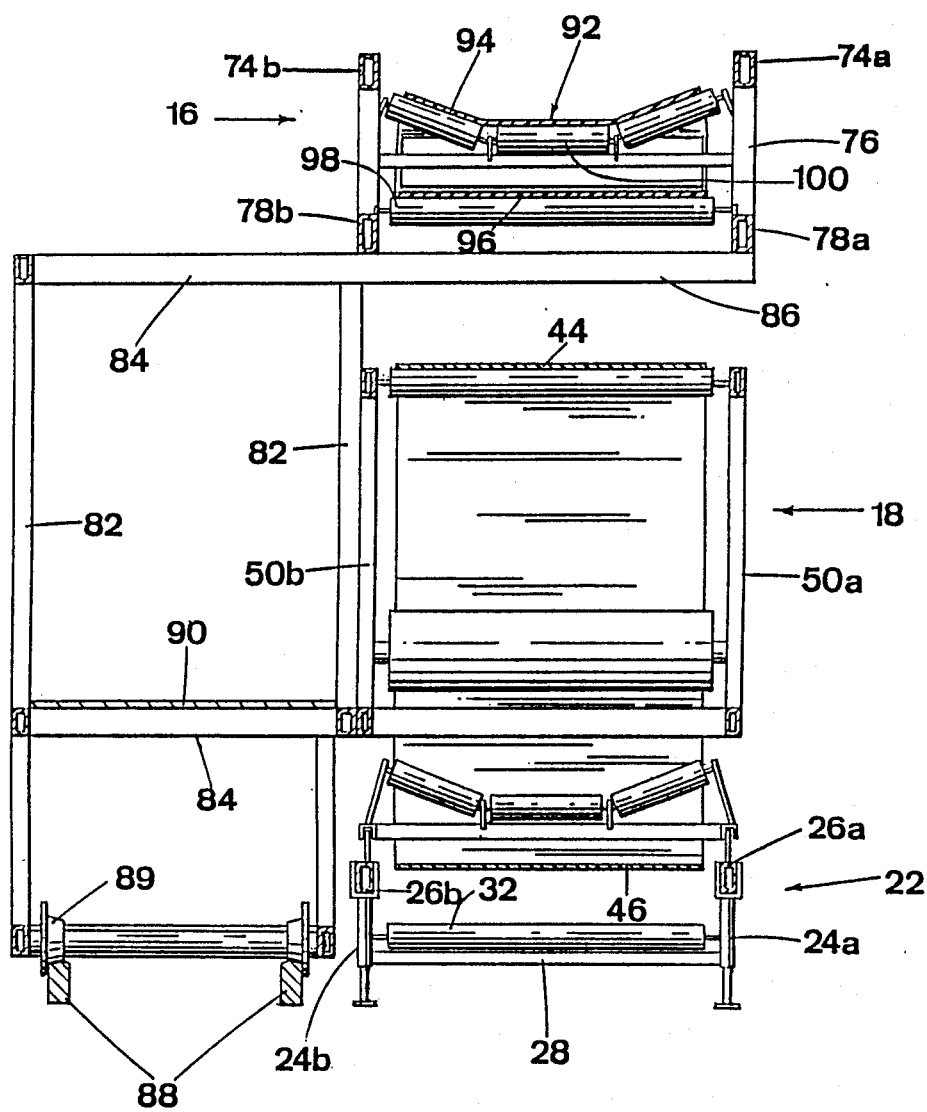
FIG. 6 is a vertical cross-section taken along line 6—6 of FIG. 1.

Referring now to the drawings, and more particularly to FIGS. 1 and 2, there is shown an extensible conveyor 10 utilized with a tunnel boring machine 12 for mining a tunnel. The tunnel boring machine 12 continuously bores the mine face of the tunnel producing broken rock commonly called muck which must be removed from the mine face. A discharge conveyor 14 is part of the tunnel boring machine 12, and a transfer conveyor 16 hauls the muck from the tunnel boring machine to the extensible conveyor 10. The extensible conveyor 10 is a fixed conveyor in the sense that it has a stationary outby end (not shown), but the inby end thereof must be continuously extended in order to follow the tunnel boring machine 12. A bridging carriage 18 is supported under the transfer conveyor on a trailing structure over the extensible conveyor as will be described in more detail.

The extensible conveyor 10 includes a conveyor frame 20 made up of identical frame modules 22. Referring to FIG. 4, a typical frame module 22 includes parallel box beams 26a and 26b supported by adjustable legs 24a and 24b. Lateral struts 28 extend between the legs 24a and 24b. Each module includes a pair of legs 24a and 24b at each end of the beams 26a and 26b connected by the struts 28 to make up a self-supporting frame module 22. Each pair of legs 24a and 24b subtend a return reach roller 32 by means of support brackets 30a and 30b mounted to the respective legs 24a and 24b. Rod-like brackets 34a and 34b are mounted on top of the beams 26a and 26b to receive the ends of the conveying reach roller cradle 36. Roller cradle 36 mounts, in this embodiment, three conveying reach rollers 38.

Brackets 40a and 40b are adapted to connect the beams 26a and 26b of respective end-to-end frame modules 22 by means of suitable nuts and bolts.

An endless conveyor belt 42 extends over the extensible conveyor frame 20. The return reach 46 of the belt 42 is supported on return reach rollers 32, while the conveying reach 44 of the belt 42 is supported on conveying reach rollers 38. The belt 42 is an endless belt with a portion thereof stored in a conventional belt magazine (not shown) which is part of the conveyor frame 20.

A carriage 18, as shown in FIGS. 2 and 3, includes carriage beams 48, columns 50, and trusses 52, making up the structure. An access opening 64 is provided centrally of the carriage 18 defined by the columns 50, the top cross beam 60, and the lower cross beam 62. All of the trusses, beams, and columns are welded or otherwise bolted together At the inby end of the carriage 18 is a conveyor pulley 54 mounted in bearings 56 which in turn are connected to the carriage 18 by means of bearing blocks 58 at each end thereof.

The conveyor 42 of the extensible conveyor 10 passes around the pulley 54. The carriage 18, however, is not connected or otherwise supported by the conveyor frame 20. As will be described later, the carriage 18 may be supported outboard of the conveyor frame 20. As shown in FIG. 3, special conveying reach rollers 66 are provided on the top of the carriage 18. An idler 68 extends between respective beams at the outby end of the carriage 18 in bearings 69 supported by bearing blocks 70.

The carriage 18 is adapted to move forwardly by the outboard rolling deck pulling with it the conveyor belt 42 which is paid out from the conveyor magazine (not shown). When the frame 20 is being extended by adding additional frame modules 22, the return reach rollers 32 are mounted to the frame modules 22 as the modules 22 are being added. The conveying reach rollers 38 mounted integrally in the cradles 36 are added only when the carriage 18 is advanced. In practice, an operator will mount the conveying reach roller cradles 36 through the access opening 64 formed in the carriage 18 to the brackets 34 on the frame modules 22. Thus, the conveying reach rollers are added to the extensible conveyor system between the reaches 44 and 46 of the conveyor belt 42.

The transfer conveyor 16 which extends from the discharge conveyor 14 of the tunnel boring machine 12 is a truss frame conveyor supported at its inby end by being connected to the frame of the discharge conveyor 14. At its outby end or in the area thereof, the truss frame 72 is supported by means of an outboard rolling deck 80 illustrated in FIG. 6. Outboard deck 80 includes columns 82 and beams 84 at the top and bottom thereof forming a cab and including a platform 90 on which an operator can stand. Wheels 89 ride on the rails 88 to support the mobile frame 80.

The truss frame 72 of conveyor 16 includes a cantilever beam 86 which is mounted to the frame members 82 and 84 of the outboard mobile frame 80 and may support the transfer conveyor 16.

The carriage 18 is mounted to the beams 82 on the side of the mobile frame 80, maintaining the carriage 18 over the conveyor frame 20 as it is being extended. In this manner, as the transfer conveyor 16 advances, pulled by the tunnel boring machine 12, the mobile frame 80 and the carriage 18 will also be pulled forward. The operator mounting the conveying reach roller cradles 36 is located on the platform 90 in the cab formed by mobile frame 80 adjacent the access opening 64. A supply of the roller cradles 36 can be placed on the platform 90.

Accordingly, as the tunneling machine 12 advances, frame modules 22 are added gradually to the front of the frame 20, and return reach rollers 32 are placed on the frame modules 22. As the carriage 18 advances pulling with it the conveyor belt 42, the operator places the conveying reach rollers 38 integrated in cradles 36 onto the frame modules 22 through the access opening 64 within and between the conveying and return reaches 44 and 46 of the belt 42. As the conveyor belt 42 advances, its conveying reach 44 will pass under the idler roller 68 and thus be supported downstream thereof on the conveying reach rollers 38.

The transfer conveyor 16 includes a truss system forming the truss frame 72 including beams 74a and 74b and struts 76 with lower beams 78a and 78b. At the outby end thereof, a conveyor pulley 102 is mounted between opposed side frame elements forming frame 72. A conveyor belt 92 extends over rollers providing a conveying reach 94 and a return reach 96.

At the outby end of the trailing conveyor 16, there is provided a pair of brackets 110a and 110b acting as journals for opposed spindles 108a and 108b which in turn subtend an impact plate 104. The impact plate 104 has side walls 106a and 106b mounting the spindles 108a and 108b. In this manner, the impact plate 104 is gimbaled about a transverse axis through the spindles 108a and 108b. The impact plate passes below the conveying reach 44 of the conveyor belt 42, between the rollers 38 and the belt reach 44. The impact plate 104 has a trough shape provided to the belt reach 44 by the shape of the rollers 38. The impact plate 104 is situated at the point of discharge of the muck from the conveyor 92 onto the conveyor belt 42. The muck, therefore, will fall on the conveying reach 44 of the belt 42 immediately over the impact plate 104. The impact plate 104 will thus provide protection from deformation or undue deterioration of the belt 42 in the receiving area.

I CLAIM:

1. A method of continuously extending a conveyor belt system, wherein the conveyor belt system includes an inby section and an outby section, a rigid frame having a return reach and a conveying reach spaced apart vertically on the rigid frame, and a conveyor belt supported about the rigid frame on the respective return reach and conveying reach, the method including independently advancing the conveyor belt while adding supplementary frame members to the inby section of the rigid frame while advancing the conveyor belt, increasing the vertical spacing between the return reach and conveying reach while inserting and conveying reach rollers onto the supplementary frame members in the space between the conveying reach and the return reach of the belt as it is being advanced near the inby end thereof.

2. A method as defined in claim 1, wherein the step of increasing the vertical spacing between the return reach and the conveying reach is limited to the supplementary frame members being added to the inby end of the rigid frame, and return reach rollers are also added to the supplementary frame members in addition to the conveying reach rollers and said conveying reach rollers and return reach rollers are located in the respective planes of the conveying reach and the return reach before vertical separation.

3. A method of continuous mining which includes advancing a mining machine for continuously advancing the mine face, conveying muck from the mine face to a discharge station downstream of the mining machine, a conveyor belt system including an inby section and an outby section, a rigid frame having a return reach and a conveying reach spaced vertically on the rigid frame, and a conveyor belt supported about the rigid frame on the respective return reach and conveying reach, the discharge station being located on the conveying reach of the conveyor belt system at a point spaced downstream from the inby section of the conveyor belt system, the method including independently advancing the conveyor belt at the inby section while adding supplementary frame members to the inby section of the rigid frame upstream of the discharge station, while advancing the conveyor belt, increasing the vertical spacing between the return reach and the conveying reach adjacent the supplementary frame members, and inserting conveying reach rollers onto the supplementary frame members in the space between the conveying reach and the return reach and in the plane of the conveying reach before the vertical spacing was increased, and inserting return reach rollers on the supplementary frame members in the plane of the return reach.

* * * * *